US011154137B2

(12) United States Patent
Davis et al.

(10) Patent No.: US 11,154,137 B2
(45) Date of Patent: Oct. 26, 2021

(54) MODULAR FURNITURE WITH LOCKING TAB AND SLOT JOINT

(71) Applicant: Clark Evan Davis, Genola, UT (US)

(72) Inventors: Clark Evan Davis, Provo, UT (US); Paul Schmidt, Provo, UT (US)

(*) Notice: Subject to any disclaimer, the term of this patent is extended or adjusted under 35 U.S.C. 154(b) by 595 days.

(21) Appl. No.: 16/104,907

(22) Filed: Aug. 19, 2018

(65) Prior Publication Data

US 2019/0059594 A1 Feb. 28, 2019

Related U.S. Application Data

(60) Provisional application No. 62/552,253, filed on Aug. 30, 2017.

(51) Int. Cl.
*A47B 47/00* (2006.01)
*A47B 47/04* (2006.01)
(Continued)

(52) U.S. Cl.
CPC .......... *A47C 4/021* (2013.01); *A47B 47/0066* (2013.01); *A47B 47/0075* (2013.01); *A47B 47/0091* (2013.01); *F16B 12/125* (2013.01); *F16B 12/22* (2013.01); *F16B 12/44* (2013.01); *A47B 47/042* (2013.01); *A47B 2230/0085* (2013.01); *A47C 4/03* (2013.01)

(58) Field of Classification Search
CPC ....... A47C 4/021; A47C 4/03; A47B 47/0066; A47B 47/0075; A47B 47/0091; A47B 47/042; A47B 2230/0085; A47B 47/0025; A47B 47/005; A47B 43/00; F16B 12/125; F16B 12/22; F16B 12/44; F16B 12/34; Y10T 403/7015; Y10T 403/7045; Y10T 403/4602; Y10T 403/4628
USPC ........ 403/353, 364, 381, 231, 240; 211/182, 211/192, 189; 297/440.13
See application file for complete search history.

(56) References Cited

U.S. PATENT DOCUMENTS 919,257 A 4/1909 Seydewitz
981,532 A 1/1911 Cary
(Continued)

FOREIGN PATENT DOCUMENTS

CA 1255355 6/1989
CH 281702 3/1952
(Continued)

OTHER PUBLICATIONS

Celery Rocking Chair viewed at http://www.eroomservice.com/manufacturer/celery/ circa Dec. 3, 2011.
(Continued)

*Primary Examiner* — Jennifer E. Novosad
(74) *Attorney, Agent, or Firm* — Pate Peterson, PLLC; Brett Peterson

(57) ABSTRACT

An joint is provided for modular furniture. The joint includes a locking tab which is held in a slot such that the tab cannot be moved out of a locking section of the slot without elastically bending the tabbed panel to prevent inadvertent disassembly of the item of furniture. The tab and slot configuration may also provide increased stiffness and rigidity to the piece of furniture while allowing the piece of furniture to be assembled without fasteners such as screws or nails.

19 Claims, 11 Drawing Sheets

(51) Int. Cl.
  *A47C 4/02*     (2006.01)
  *F16B 12/44*    (2006.01)
  *F16B 12/22*    (2006.01)
  *F16B 12/12*    (2006.01)
  *A47C 4/03*     (2006.01)

(56) References Cited

U.S. PATENT DOCUMENTS

| | | |
|---|---|---|
| 1,061,297 A | 5/1913 | Johnson |
| 1,419,647 A | 6/1922 | Shepherdson |
| 1,431,823 A | 10/1922 | Georges |
| 1,747,900 A | 2/1930 | Jenny |
| 1,903,631 A | 4/1933 | Morrison |
| 1,940,117 A | 12/1933 | Carpos |
| 1,981,646 A | 11/1934 | Hamley |
| 2,240,256 A | 4/1941 | Elmendorf |
| 2,279,864 A * | 4/1942 | Eide ............... A47B 47/042 211/189 |
| 2,334,912 A | 11/1943 | Eide |
| 2,369,930 A | 2/1945 | Wagner |
| D144,730 S | 5/1946 | Perrault |
| 2,418,731 A | 4/1947 | Seitz |
| 2,479,086 A | 8/1949 | Silverman |
| 2,481,671 A | 9/1949 | John et al. |
| 2,486,987 A | 11/1949 | Scarlett |
| 2,518,955 A | 8/1950 | Stelzer |
| 2,534,413 A | 12/1950 | Cenis |
| 2,551,071 A | 5/1951 | Tyncs |
| D164,552 S | 9/1951 | Curtis |
| 2,595,002 A | 4/1952 | Schneider |
| 2,602,012 A | 7/1952 | Doty |
| 2,615,771 A | 10/1952 | Curtis |
| 2,632,498 A | 3/1953 | Curtis |
| 2,672,181 A | 3/1954 | Rose |
| 2,677,491 A | 5/1954 | Burger |
| 2,703,724 A | 3/1955 | Der Yuen |
| 2,720,253 A | 10/1955 | Turner |
| 2,745,591 A | 5/1956 | Holt |
| 2,786,789 A | 3/1957 | Carlson |
| 2,792,877 A | 5/1957 | West |
| 2,801,895 A | 8/1957 | Gass |
| 2,825,101 A | 3/1958 | Rubsnstein |
| 3,053,598 A | 9/1962 | Cheslow |
| 3,089,675 A | 5/1963 | Lozier |
| 3,149,880 A | 9/1964 | Steuer |
| 3,186,027 A | 6/1965 | Merillat |
| 3,262,405 A | 7/1966 | Sutton |
| 3,300,170 A | 1/1967 | Charles |
| 3,300,245 A | 1/1967 | Rumble |
| D212,601 S | 11/1968 | Rubsnstein |
| 3,527,497 A | 9/1970 | Self |
| 3,547,491 A | 12/1970 | Bovasso |
| 3,578,385 A | 5/1971 | Stiglitz |
| 3,603,274 A | 9/1971 | Ferdinand |
| 3,603,656 A | 9/1971 | Ferman |
| 3,636,893 A | 1/1972 | Lange |
| 3,674,328 A | 7/1972 | White et al. |
| 3,684,285 A | 8/1972 | Kane |
| 3,697,363 A | 10/1972 | Martinez |
| 3,783,801 A | 1/1974 | Engman |
| 3,788,700 A | 1/1974 | Wartes |
| 3,812,977 A | 5/1974 | Glassman |
| 3,831,533 A | 8/1974 | Kellogg |
| 3,847,435 A | 11/1974 | Skinner |
| 4,021,128 A | 5/1977 | Chiames |
| 4,055,924 A | 11/1977 | Beaver |
| D247,596 S | 3/1978 | Osamu |
| 4,082,356 A | 4/1978 | Johnson |
| 4,099,472 A | 7/1978 | Kellogg |
| 4,103,818 A * | 8/1978 | Raubenheimer ... B65D 5/48038 206/459.5 |
| 4,140,065 A * | 2/1979 | Chacon ............... A47C 4/021 108/156 |
| 4,153,311 A | 5/1979 | Takhasaki |
| 4,158,277 A | 6/1979 | Krempp et al. |
| 4,188,067 A | 2/1980 | Elmer |
| 4,191,113 A | 3/1980 | Hogberg |
| 4,202,581 A | 5/1980 | Fleishman |
| 4,225,180 A | 9/1980 | Gillis |
| 4,258,464 A | 3/1981 | Ullman |
| 4,348,052 A | 9/1982 | Roland |
| 4,390,204 A | 6/1983 | Fleishman |
| 4,419,028 A | 12/1983 | Roland |
| 4,433,753 A | 2/1984 | Watson |
| 4,433,843 A | 2/1984 | Bricco |
| 4,492,332 A | 1/1985 | Collins |
| 4,501,512 A | 2/1985 | Hiltz |
| 4,509,794 A | 4/1985 | Roland |
| 4,533,174 A | 8/1985 | Fleishman |
| 4,544,092 A | 10/1985 | Palmer |
| 4,548,350 A | 10/1985 | Engle |
| 4,574,917 A | 3/1986 | Stoddard |
| 4,591,090 A | 5/1986 | Collins |
| 4,593,950 A | 6/1986 | Vittorio |
| 4,595,105 A | 6/1986 | Gold |
| D289,234 S | 4/1987 | Hoult |
| 4,685,609 A | 8/1987 | Ferrari |
| 4,706,573 A | 11/1987 | Sielaff |
| 4,712,837 A | 12/1987 | Swilley |
| 4,759,449 A | 7/1988 | Gold |
| D299,087 S | 12/1988 | Bruce |
| 4,841,878 A | 6/1989 | Kriegsman |
| D302,216 S | 7/1989 | Roland |
| 4,846,530 A | 7/1989 | Noble |
| 4,867,327 A | 9/1989 | Roland |
| 4,878,439 A | 11/1989 | Samson |
| 4,884,420 A | 12/1989 | Finkel |
| 4,926,759 A | 5/1990 | Vitsky et al. |
| 4,934,765 A | 6/1990 | Slifer |
| 5,011,228 A | 4/1991 | Marcantel |
| 5,069,144 A | 12/1991 | Williford |
| 5,082,329 A | 1/1992 | Mars |
| 5,253,594 A | 10/1993 | Sideris |
| 5,253,595 A | 10/1993 | Heidmann |
| 5,263,766 A | 11/1993 | McCullough |
| 5,275,467 A * | 1/1994 | Kawecki ............... A47C 4/021 297/411.29 |
| 5,343,816 A | 9/1994 | Sideris |
| 5,354,589 A | 10/1994 | Waas |
| 5,367,964 A | 11/1994 | Hockensmith |
| 5,387,027 A | 2/1995 | Maloney |
| 5,454,331 A | 10/1995 | Green |
| 5,605,378 A | 2/1997 | Oyediran |
| 5,613,449 A | 3/1997 | Pullman |
| 5,644,995 A | 7/1997 | Gurwell et al. |
| 5,655,812 A | 8/1997 | Albecker |
| 5,706,741 A | 1/1998 | Thorp |
| 5,720,537 A | 2/1998 | Lutz |
| 5,752,611 A | 5/1998 | Nakagawa |
| 5,765,922 A | 6/1998 | Hsia |
| 5,803,548 A | 9/1998 | Battle |
| 5,803,561 A | 9/1998 | Puehlhorn |
| 5,881,653 A | 3/1999 | Pfister |
| 5,901,521 A | 5/1999 | Guy |
| 5,921,631 A | 7/1999 | Bush |
| 5,927,816 A | 7/1999 | Hsu |
| 5,941,377 A | 8/1999 | Hart |
| 5,992,938 A | 11/1999 | Jones |
| 6,029,584 A | 2/2000 | Cochrane |
| 6,036,270 A | 3/2000 | Bufalini |
| 6,041,920 A | 3/2000 | Hart |
| D422,799 S | 4/2000 | Dworshak et al. |
| 6,053,585 A | 4/2000 | Osen |
| 6,109,695 A | 8/2000 | Kahwaji |
| 6,126,022 A | 10/2000 | Merkel |
| 6,155,641 A | 12/2000 | Frost |
| 6,174,116 B1 | 1/2001 | Brand |
| 6,189,974 B1 | 2/2001 | Beck |
| 6,247,754 B1 | 6/2001 | Vanderaue et al. |
| 6,283,564 B1 | 9/2001 | Corson |
| 6,347,772 B1 | 2/2002 | L'Hotel |
| 6,378,707 B1 | 4/2002 | Taggert |
| 6,443,076 B1 | 9/2002 | Case |
| 6,532,878 B2 | 3/2003 | Tidemann |

(56) References Cited

U.S. PATENT DOCUMENTS

| | | | |
|---|---|---|---|
| 6,595,378 B2 | 7/2003 | Wang | |
| 6,615,746 B2 | 9/2003 | Bart | |
| 6,615,999 B1 | 9/2003 | Culp | |
| 6,619,749 B2 | 9/2003 | Willy | |
| 6,675,979 B2 * | 1/2004 | Taylor | A47B 47/042 108/153.1 |
| 6,769,369 B1 | 8/2004 | Brandenberg | |
| 6,807,912 B2 | 10/2004 | Willy | |
| D499,577 S | 12/2004 | Willy | |
| 6,845,871 B1 | 1/2005 | Culp | |
| 6,848,747 B1 | 2/2005 | Robinson | |
| 6,895,870 B1 | 5/2005 | Bizlewicz | |
| 6,955,401 B1 | 10/2005 | Shoulberg | |
| 6,994,222 B2 * | 2/2006 | Hunt | A47B 81/068 211/183 |
| 7,066,548 B2 | 6/2006 | Butler | |
| 7,114,300 B1 | 10/2006 | Culp | |
| 7,168,766 B2 | 1/2007 | Pelletier | |
| 7,219,962 B2 | 5/2007 | Stone | |
| D547,076 S | 7/2007 | Hughes et al. | |
| 7,255,403 B2 | 8/2007 | Butler | |
| 7,300,110 B1 | 11/2007 | Debien | |
| 7,386,960 B2 | 6/2008 | Molteni | |
| 7,533,940 B1 * | 5/2009 | Zook | A47B 83/02 297/440.13 |
| 7,631,605 B2 | 12/2009 | Willy | |
| 7,765,942 B2 | 8/2010 | Choi | |
| 7,856,772 B1 | 12/2010 | Culp et al. | |
| 8,123,311 B2 | 2/2012 | Nilsson | |
| 8,167,377 B2 | 5/2012 | Kovach | |
| 8,215,245 B2 | 7/2012 | Morrison | |
| 8,220,399 B2 | 7/2012 | Berent et al. | |
| 8,332,917 B2 | 12/2012 | Elliot | |
| 8,459,476 B2 | 6/2013 | Malekmadani | |
| 8,590,976 B2 * | 11/2013 | Davis | A47C 4/021 297/440.13 |
| 8,651,298 B2 * | 2/2014 | Beaty | A47B 47/042 211/135 |
| 8,667,911 B2 | 3/2014 | Brandenberg | |
| 9,277,814 B2 | 3/2016 | Winker | |
| 9,282,819 B2 | 3/2016 | Blake | |
| 9,447,804 B2 | 9/2016 | Andersson | |
| 9,534,623 B2 | 1/2017 | Anderson et al. | |
| 9,615,663 B2 | 4/2017 | Davis | |
| 9,668,573 B2 * | 6/2017 | Salani | A47F 7/0035 |
| 9,706,836 B1 | 7/2017 | Nelson | |
| 10,138,917 B2 | 11/2018 | Koch | |
| 10,227,162 B2 | 3/2019 | Davis | |
| 10,660,433 B1 * | 5/2020 | Jomaa | A47B 47/021 |
| 10,823,214 B2 * | 11/2020 | Davis | F16B 12/46 |
| 2003/0107255 A1 | 6/2003 | Willy | |
| 2004/0056526 A1 | 3/2004 | Willy | |
| 2004/0227041 A1 | 11/2004 | Lewis | |
| 2007/0169429 A1 * | 7/2007 | Wu | A47C 5/125 52/405.4 |
| 2007/0187348 A1 | 8/2007 | Malekmadani | |
| 2008/0074013 A1 | 3/2008 | Ahlgrim et al. | |
| 2008/0302748 A1 | 12/2008 | Tsai | |
| 2009/0066140 A1 | 3/2009 | Berent et al. | |
| 2009/0084740 A1 | 4/2009 | Lin | |
| 2010/0003077 A1 | 1/2010 | Kelley | |
| 2012/0080910 A1 | 4/2012 | Davis | |
| 2013/0062294 A1 | 3/2013 | Beaty | |
| 2013/0080286 A1 | 3/2013 | Rotholz | |
| 2013/0170904 A1 | 7/2013 | Cappelle | |
| 2014/0048176 A1 | 2/2014 | Susnjara | |
| 2014/0048177 A1 | 2/2014 | Susnjara | |
| 2014/0059829 A1 | 3/2014 | Weber | |
| 2014/0186104 A1 * | 7/2014 | Hamberger | F16B 5/0016 403/292 |
| 2014/0263130 A1 | 9/2014 | Davis | |
| 2015/0230600 A1 * | 8/2015 | Schulte | A47B 96/201 312/265.5 |
| 2015/0335155 A1 | 11/2015 | Winker | |
| 2017/0023043 A1 | 1/2017 | Koelling et al. | |
| 2017/0079426 A1 | 3/2017 | Davis | |
| 2017/0086578 A1 | 3/2017 | Nowak | |
| 2017/0099961 A1 | 4/2017 | Church | |
| 2017/0265650 A1 * | 9/2017 | Adair | F16B 12/125 |
| 2018/0112696 A1 | 4/2018 | Davis | |
| 2019/0038023 A1 | 2/2019 | Stocker | |
| 2019/0040890 A1 * | 2/2019 | Davis | A47B 88/941 |
| 2019/0059593 A1 | 2/2019 | Davis | |
| 2019/0059594 A1 * | 2/2019 | Davis | A47B 47/0066 |
| 2019/0085886 A1 | 3/2019 | Davis | |
| 2019/0107131 A1 * | 4/2019 | Davis | B65D 9/06 |
| 2019/0254424 A1 | 8/2019 | Rassat | |
| 2020/0370585 A1 * | 11/2020 | Huang | A47B 96/201 |

FOREIGN PATENT DOCUMENTS

| | | |
|---|---|---|
| DE | 1529719 | 5/1969 |
| DE | 2100168 | 11/1972 |
| DE | 3925302 | 2/1991 |
| DE | 9201 692 | 4/1992 |
| DE | 29914896 | 12/1999 |
| DE | 29906711 | 1/2000 |
| DE | 102007058662 | 6/2009 |
| DE | 102014006155 | 10/2014 |
| EP | 0299695 | 1/1989 |
| FR | 1300853 | 8/1962 |
| FR | 2634991 | 2/1990 |
| FR | 2654164 | 5/1991 |
| GB | 143840 | 12/1920 |
| GB | 810752 | 3/1959 |
| GB | 2353080 | 2/2001 |
| NL | 1025719 | 9/2005 |
| WO | WO 2005-085656 | 9/2005 |

OTHER PUBLICATIONS

PlyGrid Shelves viewed at http://offi.com/products/offikids/PLYGRID.php?p2c=249 circa Dec. 3, 2011.

Snap Table viewed at http://www.offi.com/pdfs/snaptable.pdf circa Dec. 3, 2011.

Furniture viewed at http://www.playatech.com/product_list.php circa Dec. 3, 2011.

Arabic Table viewed at http://www.plydea.com/support/assemblypdf.html circa Dec. 3, 2011.

Blue7Chair viewed at http://www.plydea.com/support/assemblypdf.html circa Dec. 3, 2011.

First Desk viewed at http://www.plydea.com/support/assemblypdf.html circa Dec. 3, 2011.

Rinaldo Chair viewed at http://www.plydea.com/support/assemblypdf.html circa Dec. 3, 2011.

Tuffet Stool viewed at http://www.plydea.com/support/assemblypdf.html circa Dec. 3, 2011.

WasteNot Basket viewed at http://www.plydea.com/support/assemblypdf.html circa Dec. 3, 2011.

Winehold Wine Rack viewed at http://www.plydea.com/support/assemblypdf.html circa Dec. 3, 2011.

* cited by examiner

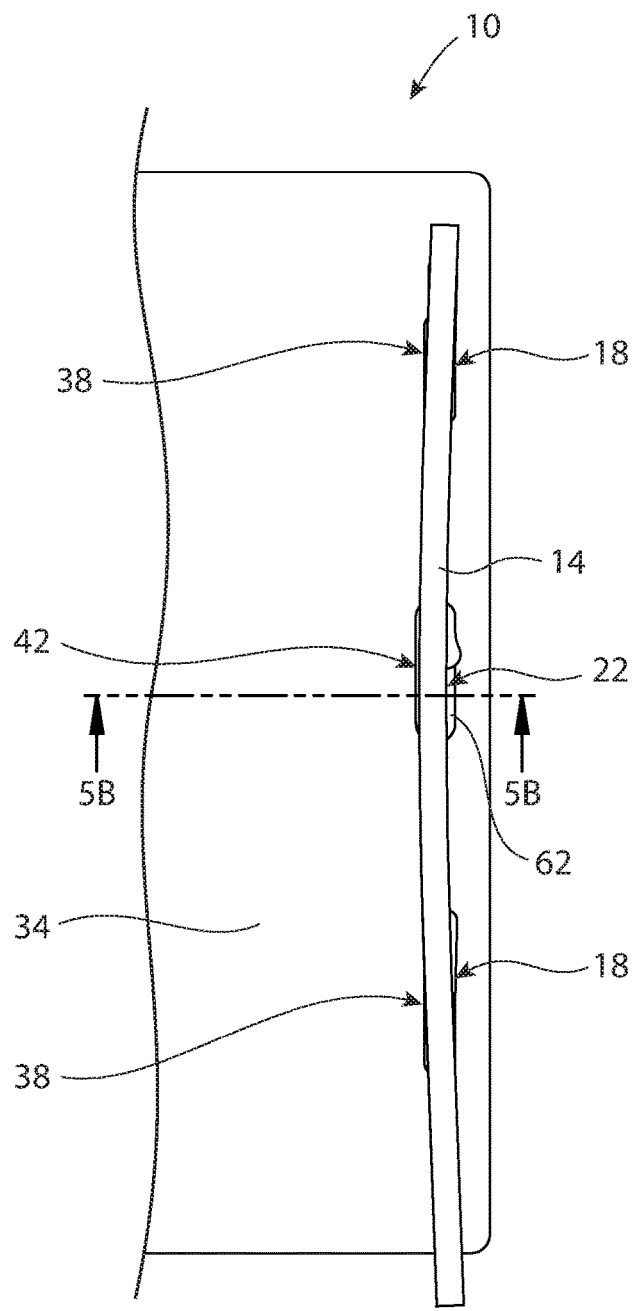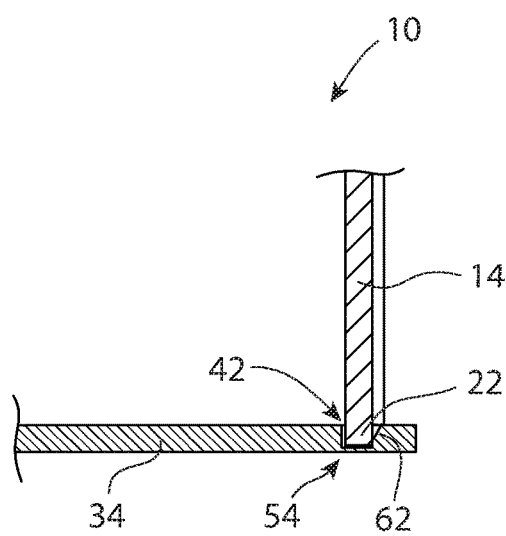
FIG 5A
FIG 5B

MODULAR FURNITURE WITH LOCKING TAB AND SLOT JOINT

RELATED APPLICATIONS

The present application claims the benefit of U.S. Provisional Application Ser. No. 62/552,253, filed Aug. 30, 2017, which is hereby incorporated by reference in its entirety.

THE FIELD OF THE INVENTION

The present invention relates to furniture. In particular, examples of the present invention relate to a modular furniture joint which allows tool-less assembly and increased stability. The present disclosure provides modular furniture joints which allow for easy assembly but prevents accidental disassembly or loosening of the piece of furniture.

BACKGROUND

Many persons desire modular furniture. Modular furniture is often assembled by the end user from flat pieces and is thus easy to store and transport in the un-assembled form. Modular furniture often suffers from instability, and in some instances modular furniture is made overly complex or uses more permanent fastening or construction methods to stabilize the furniture. This, however, makes the furniture more cumbersome for the end user and reduces some of the portability and ease of use associated with this type of furniture. Additionally, the use of fasteners such as screws or nails to stabilize the furniture is often problematic in the long term as these fasteners become loose with use and movement of the furniture.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

FIG. 5A shows a side view drawing of the locking joint.

FIG. 5B shows a cross-sectional view drawing of the locking joint.

Figure 1:
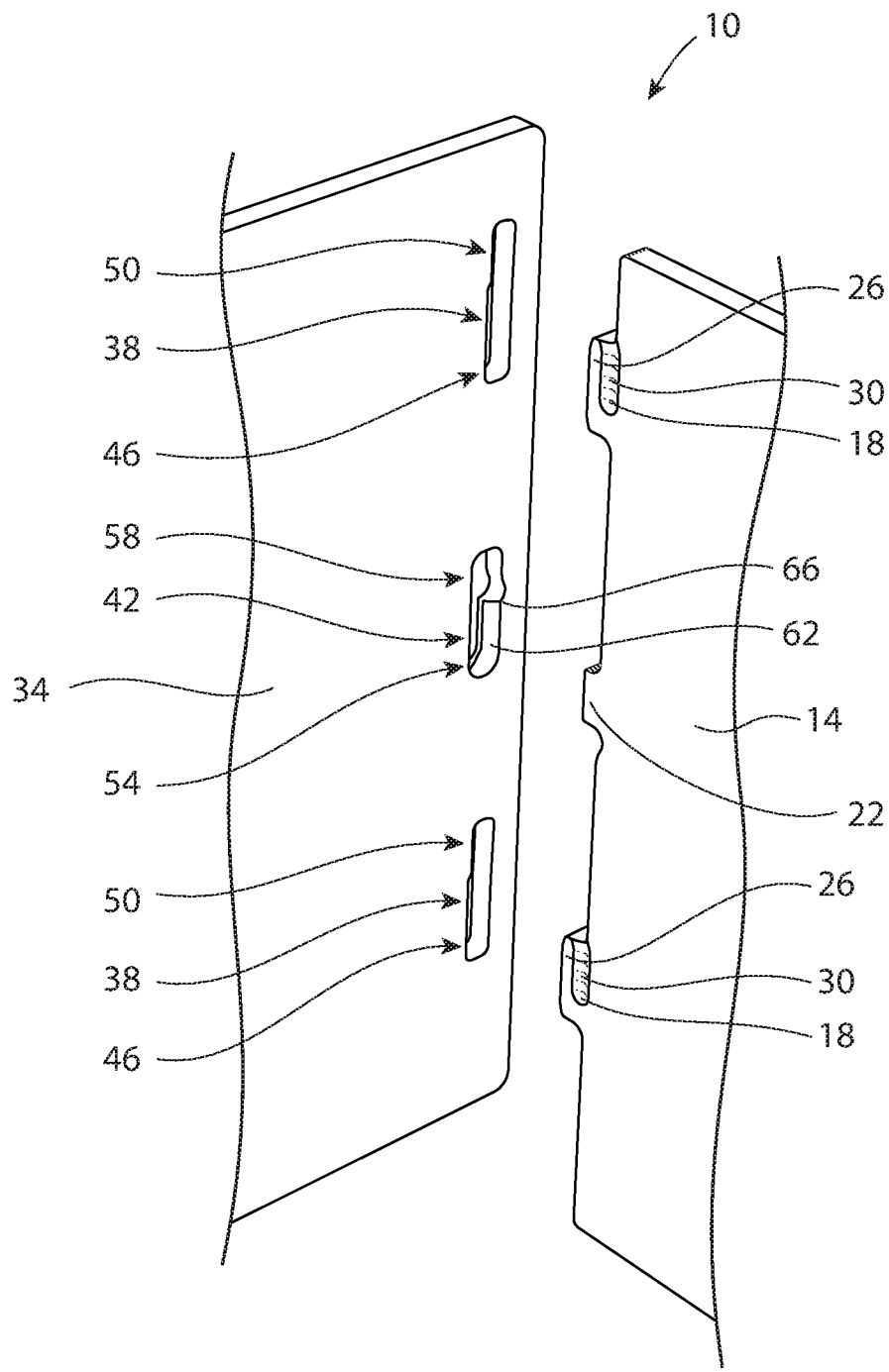
FIG. 1 shows a perspective view drawing of a locking joint.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help to improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art and that the drawings are not necessarily drawn to scale.

The present disclosure describes how an item of modular furniture may be constructed with a joint which includes a first panel with one or more pairs of retention tabs and a second panel with corresponding slots which are designed such that the tabs cannot pull out of the slot perpendicular to the second panel without first moving parallel to the plane of the panel within the slots to move out of a locking/retention section of the slots. The first panel also includes a tab which engages a locking slot formed in the second panel to prevent accidental parallel movement of the first panel relative to the second panel. This prevents accidental disassembly of the joint and also keeps the joint from working loose during use of the piece of furniture.

The illustrated locking joint may be used in a variety of different items of modular furniture such as a bookcase or shelving unit, a drawer or box, a desk, etc. These items of modular furniture are typically constructed from flat panels of a material such as plywood. Accordingly, the joint may be formed between two flat panels which are joined to each other at an angle such that a first panel intersects a second panel. Often, the first panel is perpendicular to the second panel.

The joint includes a first panel with a locking tab extending outwardly from an edge of the panel as well as a retention tab such as a hook joint tab or dovetail tab extending from the same edge of the panel. A second panel includes a mating locking slot and a retention slot such as a hook joint slot or dovetail slot which are lined up with the locking tab and retention tab on the first panel. When the retention tab(s) enter the open side of the retention slot(s), the locking tab is pressed against an inclined face which is formed adjacent an edge of the locking slot. As the retention tab(s) fully enter the retention slot(s), the locking tab is pushed sideways by the inclined face and the first panel is elastically bent out of plane.

When the retention tab(s) are slid to a retention section of the retention slot(s) they are unable to withdraw perpendicularly out of their slot(s). Simultaneously, the locking tab clears the inclined face, and pops into an open locking section in the locking slot. This allows the first panel to relax and some or all of the elastic bending is relieved.

The resistance of the first panel to flexing and a shoulder formed in the locking slot which contacts a back edge of the locking tab prevent the two panels from being disassembled unless purposeful action is taken to disassemble the item of furniture. The first panel can be formed with slits extending upwardly from the sides of the panel adjacent the edges of the locking tab and into the panel to increase the flexibility of the locking tab.

FIG. 1 shows a perspective view of a furniture joint 10 including a first panel and second panel. The first panel 14 is formed with two retention tabs 18 and a locking tab 22 as well as a second panel with three tabs. The retention tabs 18 include a distal end 26 and a proximal neck 30 which attaches the retention tabs 18 to an edge of the first panel 14 as shown. The neck 30 is thinner than the distal end 26. The distal end 26 is often the same thickness as the first panel 14 and the neck 30 is cut thinner than the first panel 14. The second panel 34 includes two corresponding retention slots 38 and a locking slot 42. The retention slots 38 each include an insertion section 46 and a retention section 50. The locking slot 42 includes an insertion section 54 and a locking section 58.

The retention slots 38 are formed so that they hold the retention tabs 18 therein and, when assembled, do not allow the first panel 14 to move transversely away from the second panel 34. The insertion sections 46 are formed so that they are larger than the retention tabs 18 and the retention tabs 18 may be inserted transversely into the retention slots 38. Once into the retention slots 38, the retention tabs 18 may be slid along the length of the retention slots 38 into the retention sections 50. The retention sections 50 have a narrowed upper opening corresponding to the tab necks 30 and are larger at a position deeper into the thickness of the second panel 34 corresponding to the retention tab ends 26. The retention sections 50 are made in a complementary shape as the retention tabs 18. Thus, if the retention tabs 18 are T-shaped or dovetail shaped, the retention sections 50 are typically also T-shaped or dovetail shaped. Once the retention tabs 18 are disposed in the retention section 50 of the retention slots 38 they cannot be pulled out of the retention slots 38 in a direction perpendicular to the second panel 34 without first sliding along the length of the retention slots 38 to the insertion section 46 of the slots 38.

In the example shown, the two retention tabs 18 are formed with a recess in the neck 30 adjacent the edge of the first panel 14. This results in a retention tab 18 where the distal end 26 of the tab is thicker than the recessed proximal neck 30 of the tab 18 which is adjacent the linear edge of the first panel 14. The two retention slots 38 are formed with a complementary overhung edge and recessed lower portion at the retention section 50 of the slots 38. The recessed neck 30 of the tabs 18 is engaged by the overhung portion of the slots 38 and the thicker distal end 26 of the tabs 18 is engaged by the recessed lower (deeper) portion of the side walls of the slots 38 when the tab 18 is in the retention section 50 of the retention slot 38. This engagement prevents the tabs 18 from being pulled out of the slots 38 perpendicular to the second panel 34 when the tabs 18 are in the retention sections 50 of the retention slots 38.

The locking tab 22 may be formed as a conventional, rectangular shaped tab. The insertion section 54 (shown on the bottom) of the locking slot 42 is formed out of alignment (shifted to the left) with the insertion sections 46 of the retention slots 38 and includes a beveled ramp 62 (on the right) formed on one side of the insertion section 54 which is located in alignment with the insertion sections 46 of the retention slots 38. The locking section 58 of the locking slot 42 is disposed in alignment with the retention sections 50 of the retention slots. The insertion section 54 and the locking section 58 of the locking slot 42 are misaligned with each other; resulting in a step/shoulder 66 formed in the locking slot 42.

In the example joint shown, the locking tab 22 and locking slot 42 are disposed in the center of the first panel 14 and second panel 34 respectively. The retention tabs 18 and retention slots 38 are disposed closer to the edges of the first panel 14 and second panel 34.

Figure 2:
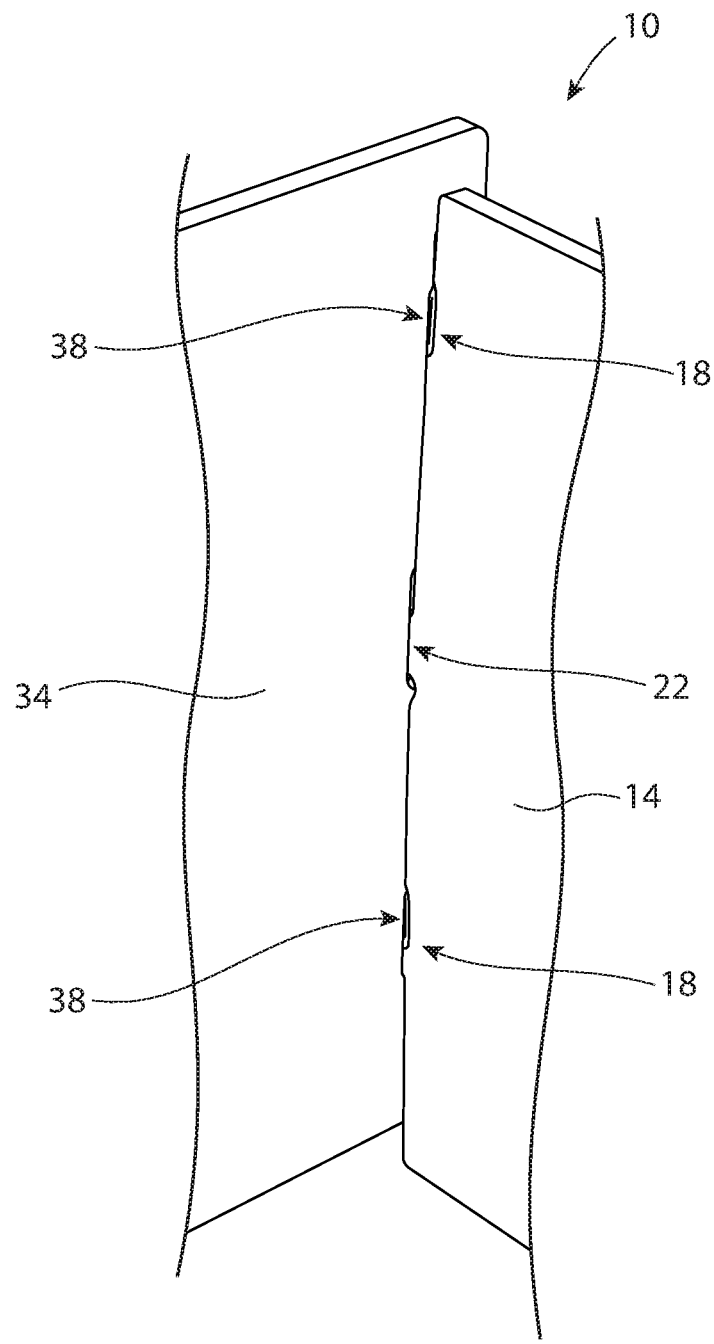
FIG. 2 shows a perspective view drawing of the locking joint.

FIG. 2 shows a perspective view of the furniture joint 10. The first panel 14 and the second panel 34 have been partially assembled and each tab 18, 22 has been inserted into its respective slot 38, 42.

The top and bottom retention slots 38 are designed such that the corresponding retention tabs 18 are inserted into an open insertion section of the respective slot in a direction perpendicular to the second panel 34 and are then moved in a direction parallel to the plane of the second panel 34 to move the tabs 18 into a retention section 46 of the slots 38. Once the tabs 18 are moved into the retention section 46 of the slots 38, the tabs 18 cannot be removed from the retention slots 38 by pulling them perpendicularly away from the second panel 34. Instead, the tabs 18 must be moved parallel to the second panel 34 to move the tabs 18 back into the insertion section 46 of the slots 38 and afterwards the tabs 18 may be moved perpendicularly out of the retention slots 38 and away from the second panel 38.

As shown, the retention tabs 18 are disposed in the insertion sections 46 of the retention slots 38 and the locking tab 22 is disposed in the insertion section 54 of the locking slot 42. The first panel 14 is flexed; with the center of the first panel 14 being bent to the left out of the page. As the tabs 18, 22 were inserted into the respective insertion sections 46, 54 of the slots 38, 42, the locking tab 22 is initially disposed out of alignment with the insertion section 54 of the locking slot 42. Instead, the locking tab 22 is aligned with the angled ramp 62 located at the side of the insertion section 54 and in alignment between the insertion sections 46 of the retention slots 38. The locking tab 22 is then pushed laterally to flex the first panel 14 as the locking tab 22 moves down into the insertion section 54 of the locking slot 42. The locking tab 22 is forced laterally into the insertion section 54 of the locking slot 42 by the sloping sidewall 62 at the same time that the retention tabs 18 are inserted into the insertion sections 46 of the retention slots 38.

Figure 3:
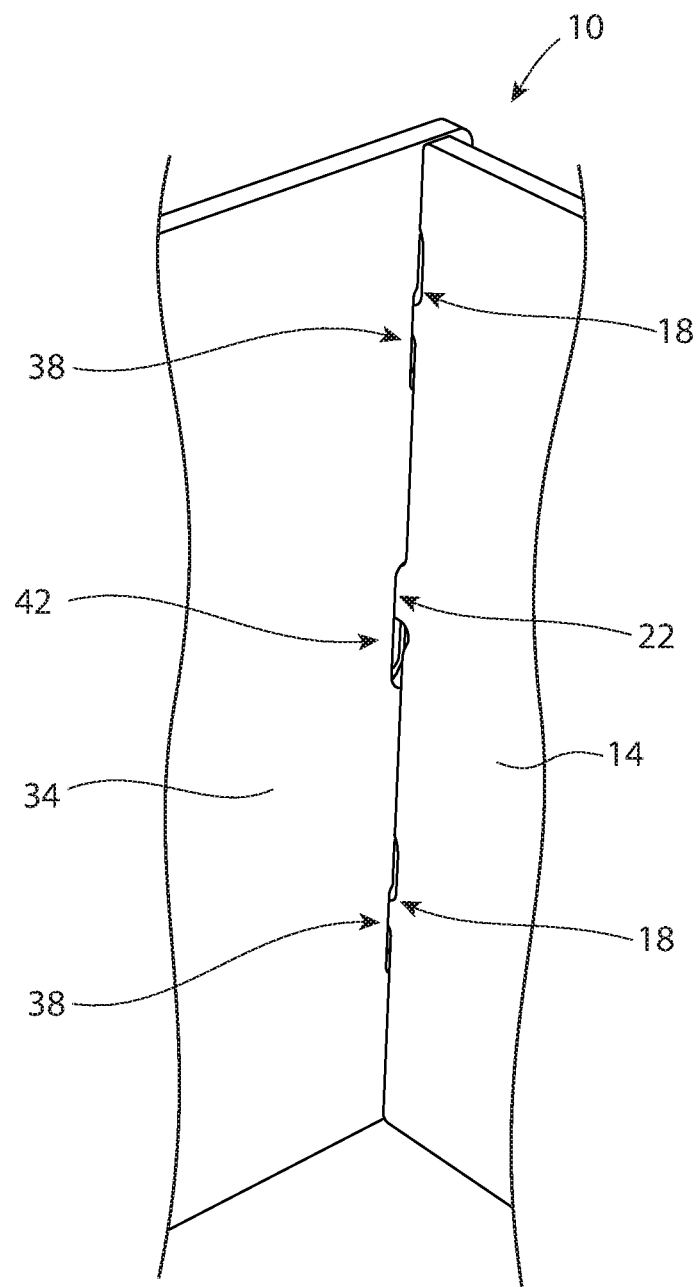
FIG. 3 shows a perspective view drawing of the locking joint.

FIG. 3 shows a perspective view of the furniture joint 10 with the first panel 14 and the second panel 34 in an assembled state. After inserting the tabs 18, 22 into the slots 38, 42, the first panel 14 has been moved vertically relative to the second panel 34 to move the retention tabs 18 into the retention sections 50 of the retention slots 38 and to move the locking tab 22 into the locking section 58 of the locking slot 42. Movement of the first panel 14 upwards relative to the second panel 34 simultaneously moves the retention tabs 18 into the retention sections 50 of the retention slots 38 and the locking tab 22 into the locking section 58 of the locking slot 42. As the locking tab 22 moves past the shoulder/ledge 66 created between the offset insertion section 54 and the locking section 58 of the locking slot 42, the locking tab 22 snaps to the right into the locking section 58 of the locking slot 42.

The first panel 14 is elastically bent out of plane during assembly as the locking tab 22 is displaced laterally by the beveled ramp edge 62 as it is inserted into the insertion section 54 of the locking slot 42. The first panel 14 may be bent by moving the locking tab 22 between approximately ⅟₅₀ of an inch and approximately ½ of an inch laterally relative to the retention tabs 18, and more particularly by moving the locking tab 22 between about ⅛ of an inch and about ¼ of an inch laterally relative to the retention tabs 18. The locking section 58 of the locking slot 42 may be positioned so that the locking tab 22 moves laterally sufficiently to release all bending of the first panel 14 once the locking tab 22 moves past the shoulder 66 and the joint 10 is fully assembled. Alternatively the locking section 58 of the locking slot 42 may be positioned so that the locking tab 22 is maintained in a position lateral to the retention tabs 18 and the first panel 14 is held elastically bent while the joint is in an assembled configuration. This configuration increases the stiffness of the assembled joint 10 and removes slop from the assembled joint 10 and resulting piece of furniture. The locking tab 22 may be held out of plane relative to the first panel 14 by approximately ⅟₅₀ of an inch, or by between about ⅟₁₀₀ of an inch and about ⅟₁₆ of an inch when the joint 10 is in an assembled configuration. Often, a piece of furniture will have one or more joints between panels where a panel does not need to be held in a bent position and one or more joints 10 between two panels where holding one of the panels in an elastically bent position when the joint is fully assembled will significantly stiffen the piece of furniture.

The engagement between the locking tab 22 and the shoulder 66 formed in the locking slot 42 keeps the retention tabs 18 from moving out of the retention sections 50 of the retention slots 38 and accordingly prevents unintentional disassembly of the joint 10. The joint 10 may be disassembled by pushing the locking tab 22 laterally to elastically flex the first panel 14 and allow the locking tab 22 to move back into the insertion section 54 of the locking slot 42.

Moving the locking tab 22 into the insertion section 54 of the locking slot 42 also moves the retention tabs 18 from the retention sections 50 to the open insertion sections 46 of the retention slots 38.

Figure 4A:
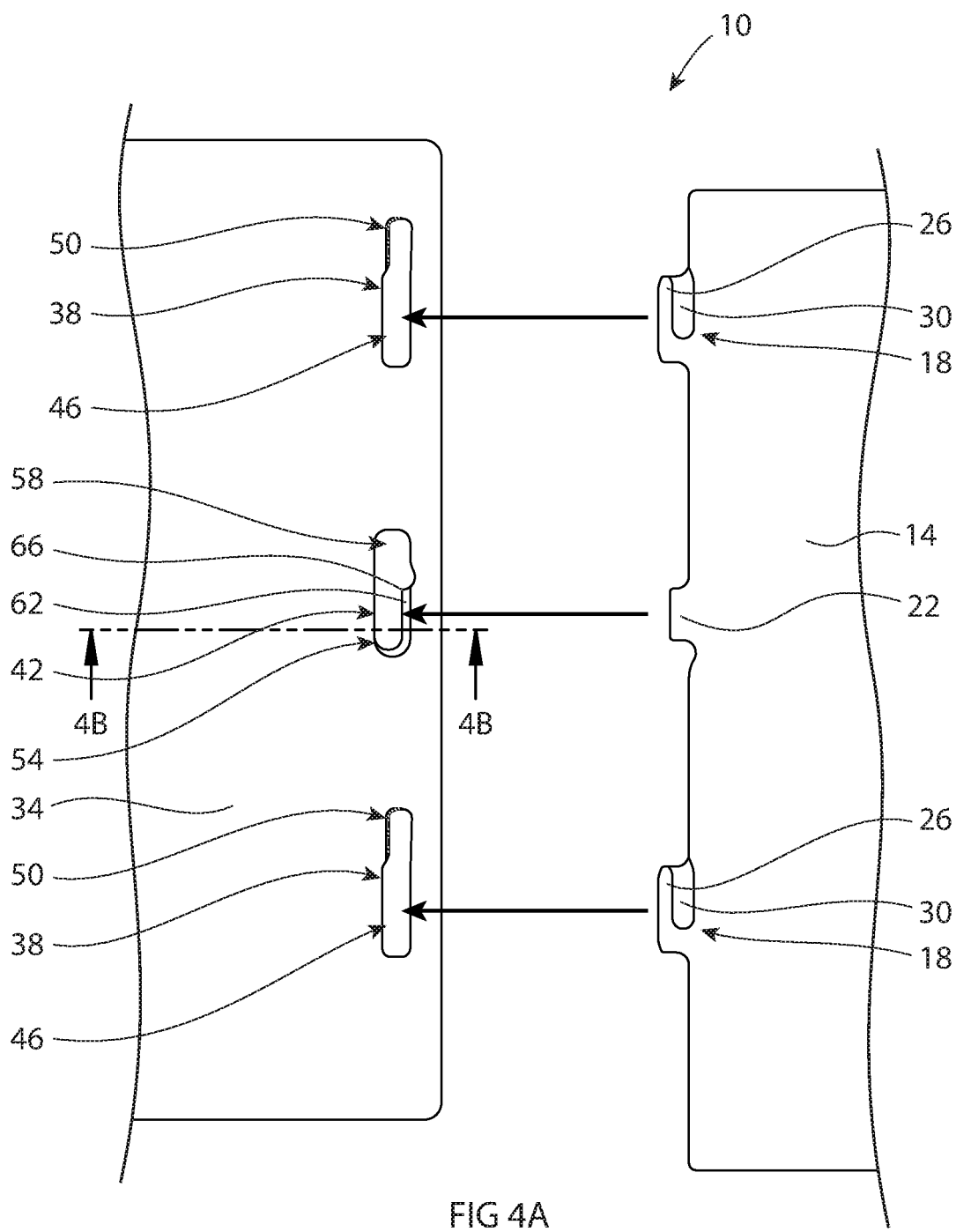
FIG. 4A shows a side view drawing of the locking joint.

FIG. 4A shows a side view of the first panel 14 and second panel 34. The relative alignment of the retention slots 38 and locking slot 42 can be seen. The insertion section 46 of the locking slot 42 is offset (here to the left) with respect to the retention slots 38 so that it is out of alignment with the retention slots 38. The beveled edge 62 connecting the insertion section 54 of the locking slot 42 to the face of the second panel 34 extends laterally (here to the right) back towards a line drawn through the retention slots 38 so that the beveled edge 62 is aligned with the insertion sections 46 of the retention slots 34. The locking section 58 of the locking slot 42 is also located back towards alignment with the retention slots 38 (here to the right). The alignment of the beveled edge 62 and misalignment of the insertion section 54 of the locking slot 42 with respect to the retention slots 38 causes the first panel 14 to bend as its tabs 18, 22 are inserted into the slots 38, 42 of the second panel. While not strictly necessary, the beveled edge 62 bends the first panel 14 as it is pushed into engagement with the second panel 34. Without the beveled edge 62, the user would have to bend the first panel 14 in order to insert the tabs 18, 22 into the insertion sections of the slots 34, 42.

As discussed above, the retention tabs 18 could also be formed as a dovetail tab. Such a tab 18 would have an enlarged distal end and a reduced neck adjacent the edge of the first panel 14, with sloping faces connecting the neck to the distal end. The retention slot 38 would have an open insertion section 46 as shown which is sufficiently large to receive the tab 18 and a retention section 50 with a dovetail shaped cross-section which engages the dovetail tab 18 and prevents the dovetail tab 18 from pulling out of the retention section in a direction perpendicular to the retention slot 38.

Figure 4B:
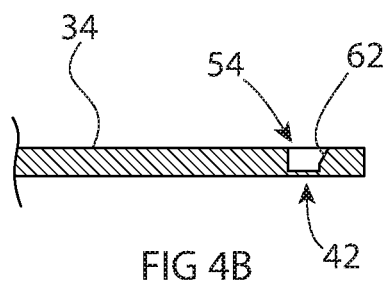
FIG. 4B shows a cross-sectional view drawing of the locking joint.

FIG. 4B shows a cross-sectional side view of a portion of the second panel 34. The cross-sectional view is taken along line 4B in FIG. 4A and shows the insertion section 54 of the locking slot 42. The insertion section 54 is offset from the retention slots 38 and the beveled edge/side wall 62 extends laterally from the insertion section 54 of the locking slot 42. The beveled edge 62 may be termed an insertion ramp 62 as it guides the locking tab 22 laterally into the insertion section 54 of the locking slot 42 and thereby bends the first panel 14 elastically. The insertion ramp 62 is formed at an angle of approximately 30 degrees from vertical (perpendicular to the first panel 14). The insertion ramp 62 may be formed at an angle which is between about 40 degrees from vertical and about 15 degrees from vertical. Forming the insertion ramp 62 at an angle which is closer to vertical will require less force to push the first panel tabs 18, 22 into the second panel slots 34, 42 but will bend the first panel less. Forming the insertion ramp 62 at an angle which is more horizontal (farther from vertical) will require more force to push the first panel tabs 18, 22 into the second panel slots 34, 42 and will bend the first panel more. The angle of the insertion ramp 62 may be determined by the desired amount of bending of the first panel 14.

FIG. 4B also shows how the retention slots 34 and locking slot 42 may each be formed as a blind slot that does not penetrate the second panel 34. For many articles of furniture, this will improve the aesthetics of the furniture. Furniture joints which use blind holes and do not penetrate the second panel are more difficult to achieve stability. The furniture joint 10 provides a stable joint and also provides a locking joint which is not accidentally disassembled. This is advantageous as the resulting piece of furniture does not loosen over time as a joint slides and moves towards a disassembled state.

FIG. 5A shows a side view of the furniture joint 10 in the same position as FIG. 2 during a first stage of assembly. The retention tabs 18 and the locking tab 22 have been pushed into the respective insertion sections 46, 54 of the retention slots 38 and locking slot 42. The beveled side wall/insertion ramp 62 on the locking slot 42 has forced the locking tab 22 sideways, causing the first panel 14 to bend elastically as shown.

FIG. 5B shows a cross-sectional side view of the furniture joint in the configuration shown in FIG. 5A taken along line 5B. The cross-sectional view extends through the insertion section 54 of the locking slot 42 as well as the insertion ramp 62. The inclined face on the insertion ramp 62 has forced the locking tab 22 sideways as it was inserted into the insertion section 54, causing the entire first panel 14 to bend.

Figure 6A:
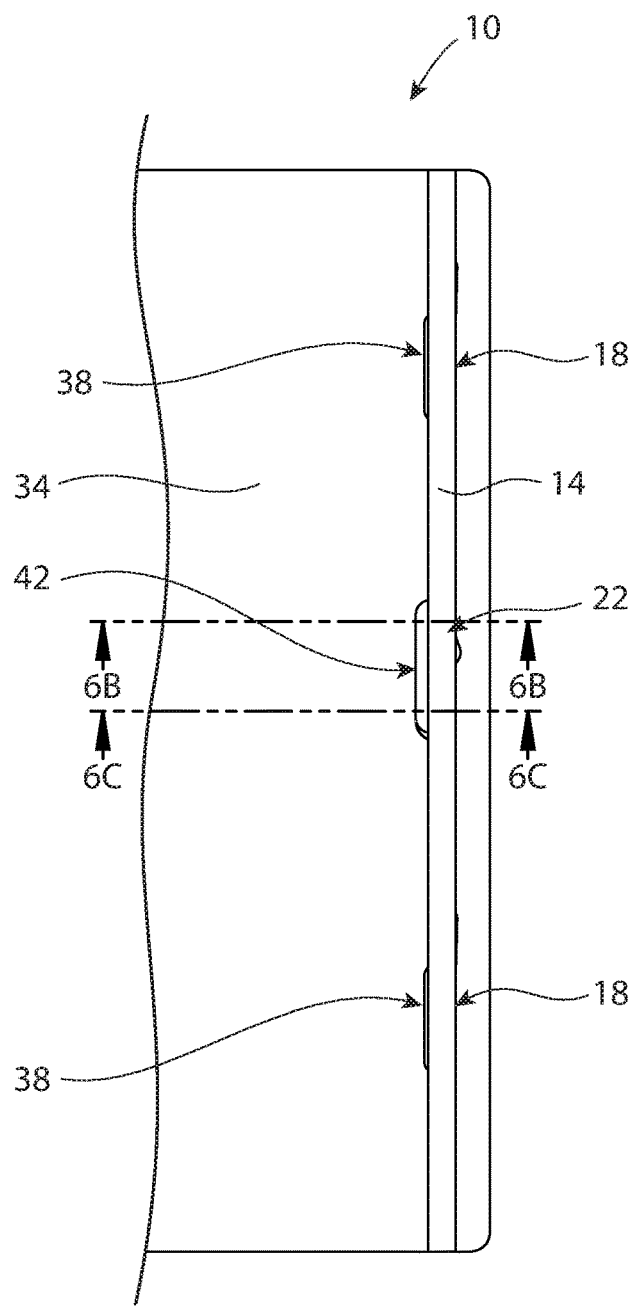
FIG. 6A shows a side view drawing of the locking joint.

FIG. 6A shows a side view of the furniture joint 10 in the same position as shown in FIG. 3. The first panel 14 has been moved upwards relative to the second panel 34 such that the joint 10 has been moved into an assembled configuration. Moving the first panel 14 upward relative to the second panel 34 moves the retention tabs 18 into the retention sections 50 of the retention slots 38 and moves the locking tab 22 into the locking section 58 of the locking slot 42. This movement of the locking tab 22 moves the tab 22 past the shoulder 66 that separates the insertion section 54 and the locking section 58 of the locking slot 42 and allows the tab 22 to move laterally and relieve some of the elastic bending of the first panel 14. In the assembled configuration shown, an amount of the elastic bending of the first panel 14 is relieved. If desired, a small amount of elastic bending may remain in the first panel 14 to add stiffness to the joint 10. This residual elastic bending of the first panel 14 is achieved by keeping the side of the locking section 58 displaced relative to the retention sections 50 of the retention slots 38.

Figure 6B:
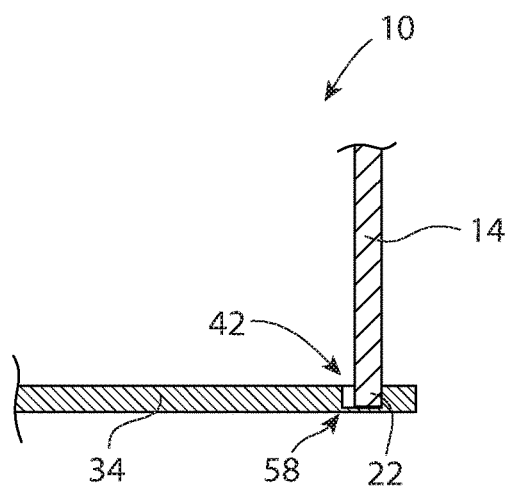
FIG. 6B shows a cross-sectional view drawing of the locking joint.

FIG. 6B shows a cross-sectional side view of the panels from FIG. 6A cut through the upper locking section 58 of the locking slot 42 along line 6B. The locking section 58 of the locking slot 42 provides space to the left of the locking tab 22 to allow the locking tab 22 to move into this section and also provides a space which the locking tab 22 fits into to allow relief of the elastic bending of the first panel 14.

Figure 6C:
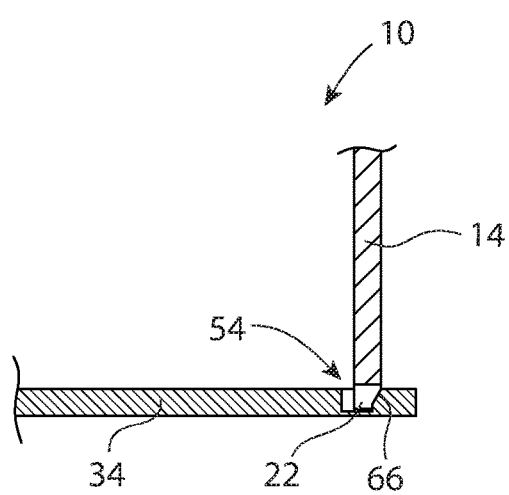
FIG. 6C shows a cross-sectional view drawing of the locking joint.

FIG. 6C shows a cross-sectional side view of the panels from FIG. 6A cut through the insertion section 54 of the locking slot 42 and taken along line 6C in FIG. 6A. The locking tab 22 has moves past the insertion ramp 62 and past the shoulder 66 into the locking section 58 of the locking slot 42. It can be seen how the locking tab 22 cannot move out of the locking slot 42 unless the first panel 14 is bent to move the locking tab 22 laterally past the shoulder 66.

The furniture joint 10 allows for the creation of easy-to-assemble furniture that can be configured to not be easily disassembled, or to not be inadvertently disassembled as affirmative action is required to disassemble the joint 10. In many designs for furniture, several different panels are assembled into the article of furniture. Often, an article of furniture includes six or eight joints between furniture panels, and four or five different furniture panels. The piece of furniture is often assembled sequentially and subsequent panels hold previously assembled panels in place. Because of this assembly sequence, the piece of furniture may have a limited number of locking furniture joints 10 described herein used in combination with other furniture joint designs and the locking joints 10 prevent disassembly of previously assembled furniture joints of other design.

To assemble the joint, the tabs are inserted into the insertion sections of the slots. The locking tab runs into the insertion ramp adjacent to the matching locking slot. As the user continues to insert the panel, the first panel is bent due to the interaction of the locking tab and the insertion ramp. Once the tabs are fully inserted into the slots, the first panel is slid sideways, pushing the tabs to the retention sections or locking section of the corresponding slots and. At the end of this movement, the locking tab clears the insertion ramp and shoulder and then pops back, relieving bending in the first panel and not allowing the panel to move backward along the slots.

To disassemble the joint, the first panel has to be flexed laterally to move the locking tab beyond the step between the locking section of the locking slot and the insertion ramp/insertion section of the locking slot. The first panel is then slid backward, disengaging the retention tabs from the retention slots. This requires intentional coordinated movement and, depending on the stiffness of the tabs and the second panel, may be impossible without sufficient strength, tools, and/or multiple people making this joint useful to prevent unintentional disassembly of the piece of furniture. The locking tab can be designed to provide an appropriate level of resistance to bending and a corresponding joint stiffness and difficulty of disassembly by selection of panel thickness as well as design of the locking tab and retention tabs.

Figure 7:
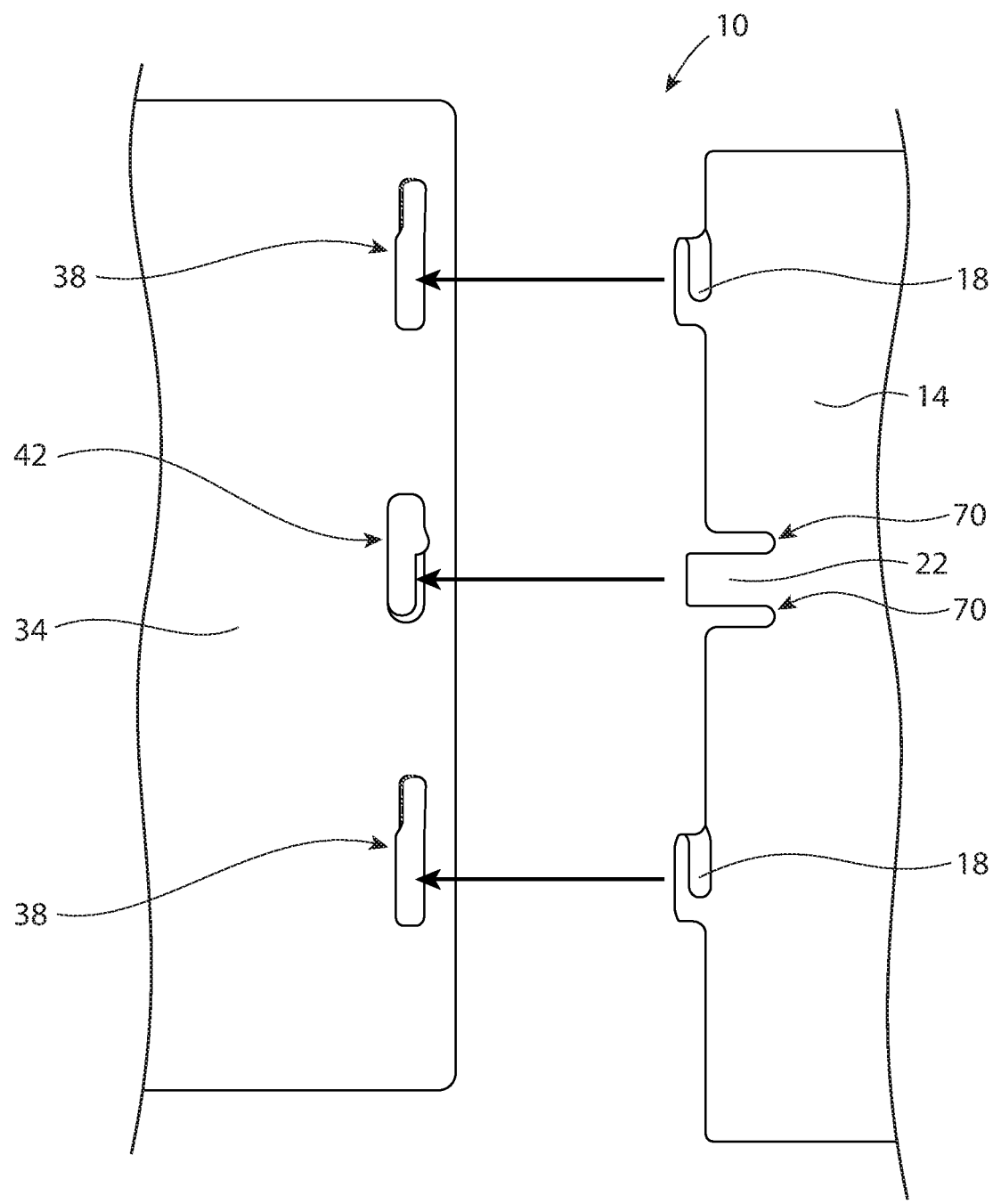
FIG. 7 shows a side view drawing of the locking joint.

FIG. 7 shows a side view of the first panel 14 and second panel 34. Slits 70 have been formed in the first panel 14. The slits 70 original adjacent the left and right edges of the locking tab 22 and extend from adjacent the edges of the locking tab 22 into the first panel 14. These slits 70 increase the bending length of the locking tab 22 and also provide greater separation of the locking tab 22 and the first panel 14. This changes the bending characteristics of the first panel 14 and locking tab 22 so that the panel 14 is partially bent and the locking tab 22 is also partially bent when the tabs 18, 22 are inserted into the slots 34, 42 as shown in FIG. 2. The bending strength of the first panel 14 can also be adjusted by changing the thickness of the first panel 14 or by adjusting the spacing of locking tab 22 and retention tabs 18. The thickness of the first panel 14 may be adjusted according to the dimensions of the first panel 14 and the spacing between the locking tab 22 and retention tabs 18.

Figure 8:
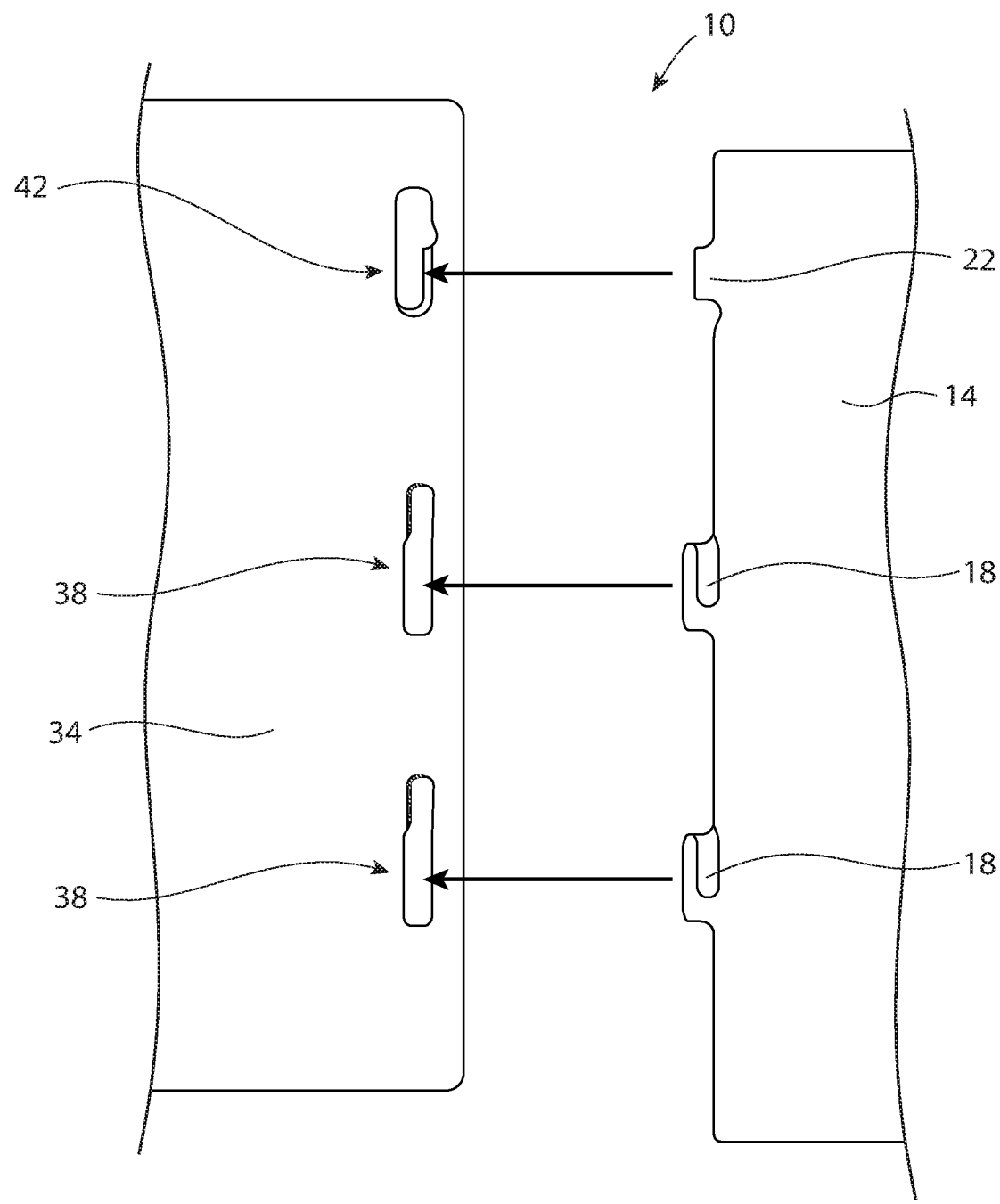
FIG. 8 shows a side view drawing of the locking joint.

FIG. 8 shows a side view of an example locking furniture joint 10 where the positioning of the retention slots 34 and retention tabs 18 and the locking slot 42 and locking tab 22 have been altered. This altered configuration assembles and functions in the manner described above with the locking tab 22 being displaced to the left during insertion into the locking slot 42 to flex the first panel 14. It is thus appreciated that the positioning of the retention tabs 18 and locking tabs 22 may be altered in the furniture joint 10.

Figure 9:
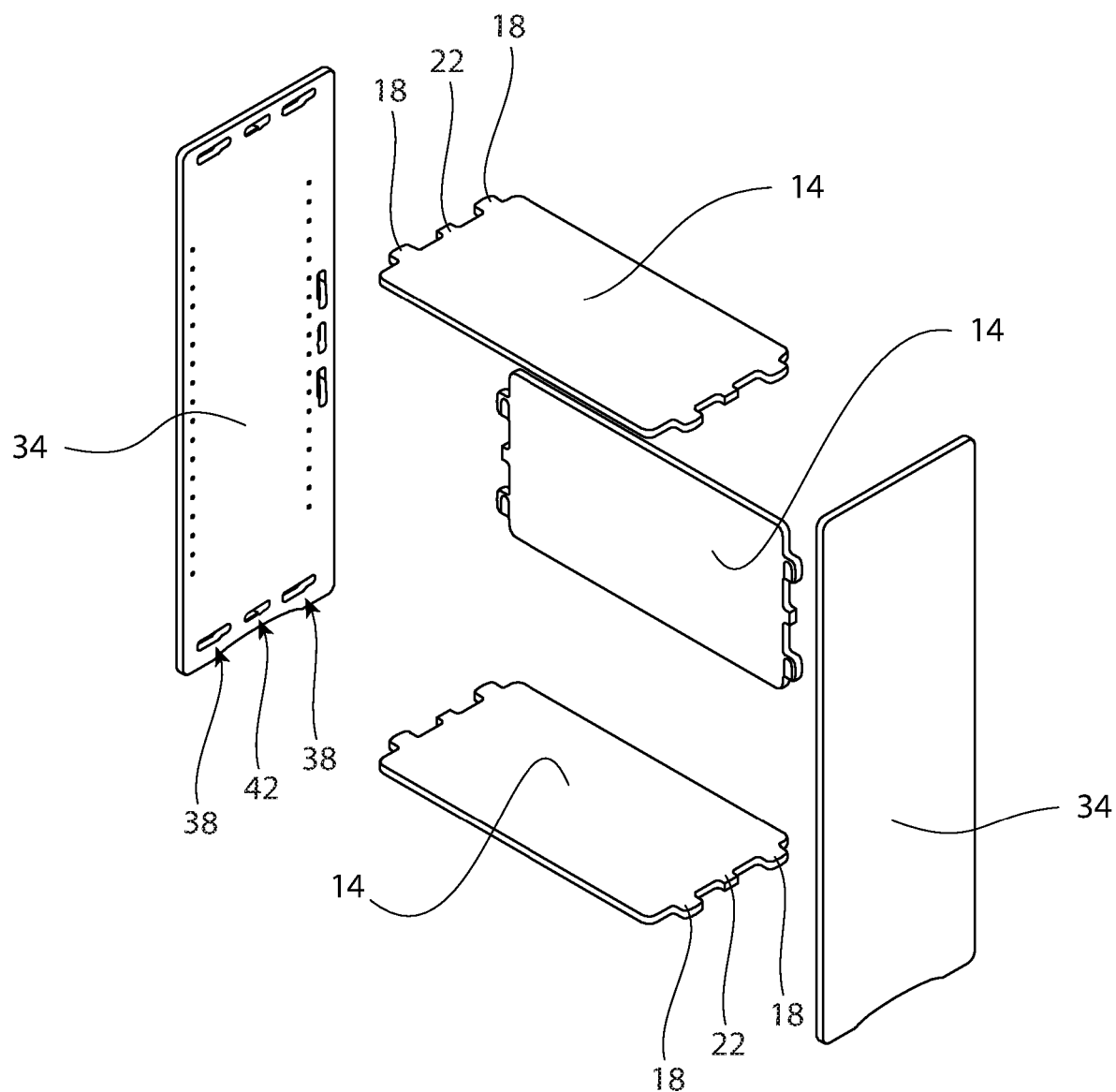
FIG. 9 shows a perspective view drawing of a piece of modular furniture incorporating the locking joint.
Figure 10:
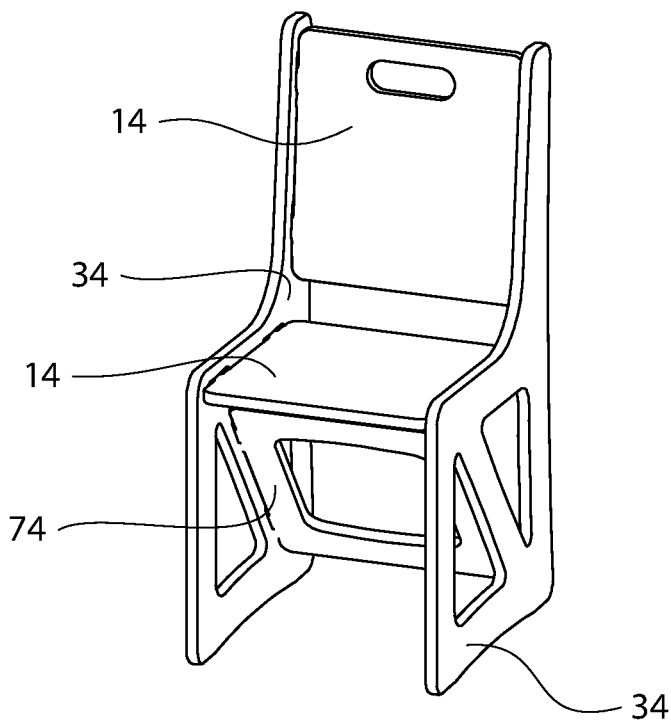
FIG. 10 shows a perspective view drawing of a piece of modular furniture incorporating the locking joint.
Figure 11:
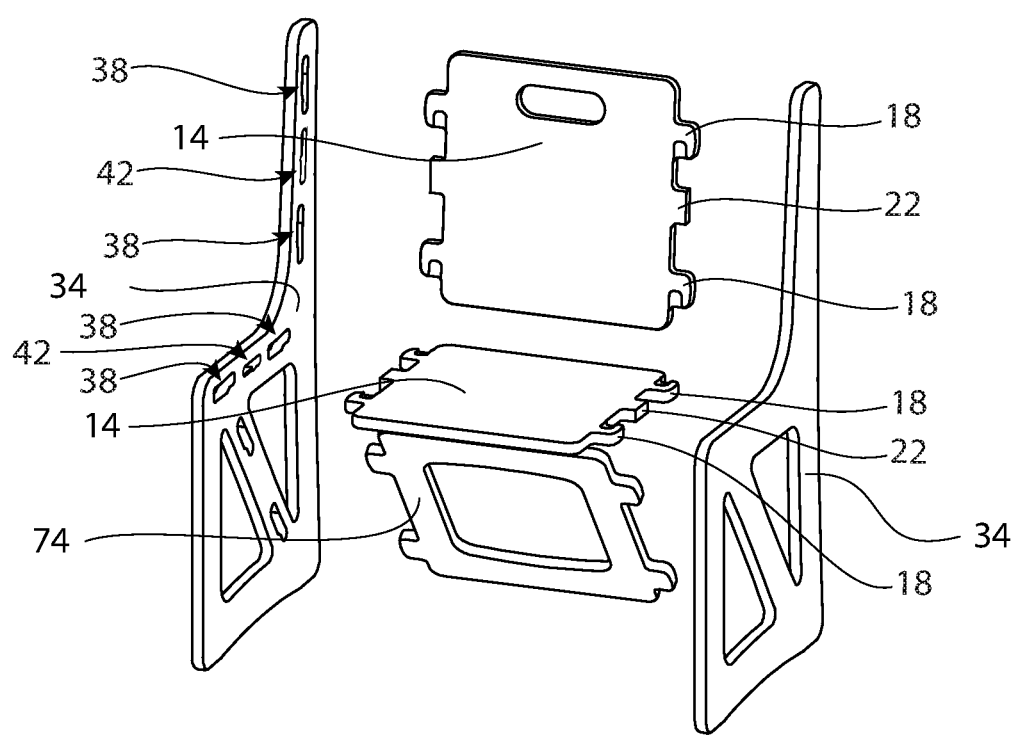
FIG. 11 shows a perspective view drawing of a piece of modular furniture incorporating the locking joint.
Figure 12:
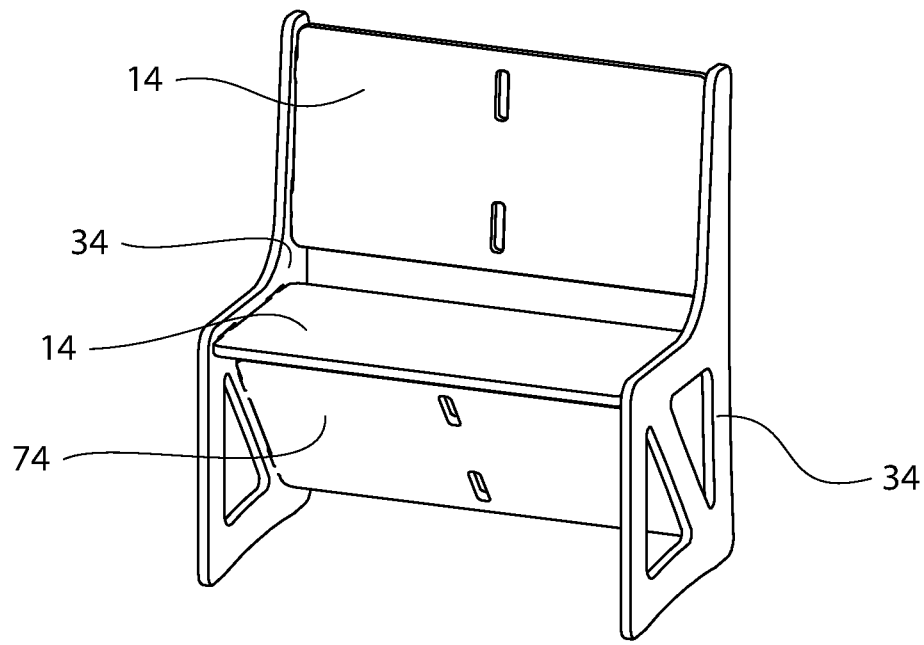
FIG. 12 shows a perspective view drawing of a piece of modular furniture incorporating the locking joint.
Figure 13:
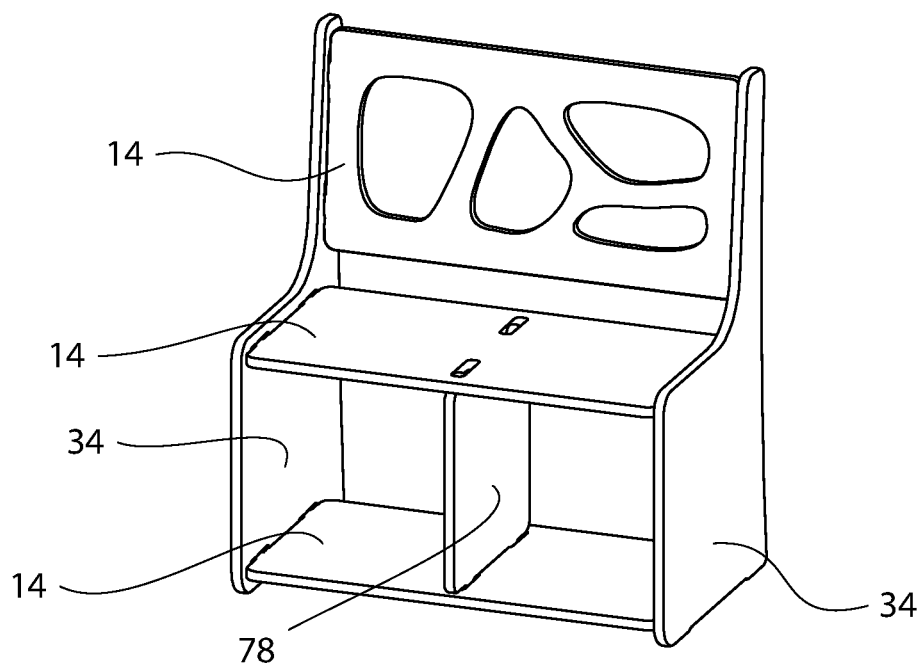
FIG. 13 shows a perspective view drawing of a piece of modular furniture incorporating the locking joint.

The locking furniture joint 10 can be used to create a variety of furniture pieces including case goods (bookshelves, dressers, night stands, cabinets) as well as other furniture. FIGS. 9 through 13 show a variety of different pieces of modular furniture for the purpose of illustrating how the locking tab 22 and slot 42 may be utilized in modular furniture. FIG. 9 illustrates how the locking joint may be used to create a bookcase or other case or box based goods such as a drawer, chest, storage box, etc. The locking tabs 22 and slots 42 may be used with retention tabs 18 and slots 38 between side panels 34 and any or all of shelf and back panels 14. FIGS. 10 through 13 illustrate how the locking tab and slot may be used to create a chair, bench, or other similar item of modular furniture. The locking tabs 22 and slots 42 may be used in joints between side panels 34 and back or seat panels 14 as well as between the side panels 43 and brace panels 74 or between seat and brace panels 14 and a divider panel 78. In each example item of modular furniture, one or more joints between intersecting panels may be made with the locking tab and slot joints 10 disclosed herein.

It will be appreciated that the locking tab and slot joints 10 are somewhat more constrained in their assembly than typical tab and slot joints. Accordingly, some items of modular furniture may become difficult to assemble if all joints are made with the locking tabs 22 and slots 42. If this is not desired, an item of furniture may be made with some locking joints 10 between panels that utilize the locking tabs 22 and slots 42 and with some other joints between different panels that utilize conventional tab and slot joints. The locking tab and slot joints 10 of the present invention may thus be used in items of modular furniture to provide an improvement of stability and strength over prior art tab and slot joints and to provide a joint 10 which is not inadvertently disassembled.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. A piece of furniture having a joint between a first panel and a second panel comprising:
    a first panel comprising:
        a locking tab extending from a first edge of the first panel; and
        a retention tab extending from a first edge of the first panel, the retention tab comprising a distal end and a neck having a reduced thickness compared to the distal end, the neck being disposed between the distal end and the first edge;
    a second panel comprising:
        a locking slot comprising an insertion section, a locking section which is offset relative to the insertion section, and a step disposed between the insertion section and the locking section;
        a retention slot comprising an insertion section with an opening configured to allow insertion of the retention tab into the retention slot and a retention section which engages the neck and distal end of the retention tab to prevent the retention tab from being withdrawn from the retention slot by moving in a direction perpendicular to the second panel;
    wherein the insertion section of the locking slot is offset laterally relative to the retention slot;
    wherein the first panel is flexed elastically in order to insert the retention tab and the locking tab into the retention slot and locking slot in a direction perpendicular to the second panel; and
    wherein the first panel is moved in a direction parallel to the second panel to thereby move the retention tab into the retention section of the retention slot and move the locking tab into the locking section of the locking slot thereby relieving elastic bending of the first panel.

2. The piece of furniture of claim 1, further comprising an insertion ramp on a side of the locking slot, wherein the insertion ramp is disposed at an angle and connects the locking slot to a face of the second panel, and wherein the locking tab contacts the insertion ramp and is moved laterally by the insertion ramp to bend the first panel while the locking tab is moved into the insertion section of the locking slot.

3. The piece of furniture of claim 1, wherein the retention slot and the locking slot are blind slots which do not extend completely through the second panel.

4. The piece of furniture of claim 1, wherein the insertion section and the retention section of the retention slot are disposed in alignment, wherein insertion section of the locking slot is disposed out of alignment with the retention slot, and wherein the locking section of the locking slot is disposed generally in alignment with the retention slot.

5. The piece of furniture of claim 1, wherein the locking section of the locking slot is disposed out of alignment with the retention section of the retention slot such that the first panel is maintained in an elastically bent configuration when the first panel is in an assembled configuration relative to the second panel.

6. The piece of furniture of claim 1, wherein the first panel further comprises a second retention tab extending from a first edge of the first panel, the second retention tab comprising a distal end and a neck having a reduced thickness compared to the distal end, the neck being disposed between the distal end and the first edge;
    wherein the second panel comprises a second retention slot comprising an insertion section with an opening configured to allow insertion of the second retention tab into the second retention slot and a retention section which engages the neck and distal end of the second retention tab to prevent the second retention tab from being withdrawn from the second retention slot by moving in a direction perpendicular to the second panel.

7. The piece of furniture of claim 6, wherein the insertion section of the retention slot and the insertion section of the second retention slot are disposed in alignment with each other and wherein the insertion section of the locking slot is disposed out of alignment with the insertion section of the retention slot and the insertion section of the second retention slot.

8. A piece of furniture having a joint between a first panel and a second panel comprising:
    a first panel comprising:
        a locking tab extending from a first edge of the first panel; and
        a retention tab extending from a first edge of the first panel;
    a second panel comprising:
        a locking slot comprising an insertion section and a locking section which is disposed out of alignment with the insertion section;
        a retention slot comprising an insertion section with an opening configured to allow insertion of the retention tab into the retention slot and a retention section;
    wherein the insertion section of the locking slot is offset laterally relative to the insertion section of the retention slot;
    wherein the first panel is flexed elastically in order to insert the retention tab into the insertion section of the retention slot and the locking tab into the insertion section of the locking slot in a direction perpendicular to the second panel; and wherein the first panel is moved in a direction parallel to the second panel to thereby move the retention tab into the retention section of the retention slot and move the locking tab into the locking section of the locking slot thereby relieving elastic bending of the first panel.

9. The piece of furniture of claim 8, wherein the retention tab comprises a distal end and a neck having a reduced thickness compared to the distal end, the neck being disposed between the distal end and the first edge.

10. The piece of furniture of claim 9, wherein the retention section of the retention slot engages the neck and distal end of the retention tab to prevent the retention tab from being withdrawn from the retention slot in a direction perpendicular to the second panel.

11. The piece of furniture of claim 8, wherein the locking slot comprises a step disposed between the insertion section and the locking section.

12. The piece of furniture of claim 11, wherein the locking section of the locking slot is offset relative to the insertion section of the locking slot and wherein the step is formed in a sidewall of the locking slot between the insertion section of the locking slot and the locking section of the locking slot and wherein the step prevents movement of the locking tab from the locking section of the locking slot to the insertion section of the locking slot.

13. The piece of furniture of claim 8, further comprising an insertion ramp on a side of the locking slot, wherein the insertion ramp is disposed at an angle relative to a face of the second panel, wherein the insertion ramp connects the locking slot to a face of the second panel, and wherein the locking tab contacts the insertion ramp and is moved laterally by the insertion ramp to bend the first panel while the locking tab is moved into the insertion section of the locking slot.

14. The piece of furniture of claim 8, wherein the retention slot and the locking slot are blind slots which do not extend completely through the second panel.

15. The piece of furniture of claim 8, wherein the insertion section and the retention section of the retention slot are disposed in alignment, wherein insertion section of the locking slot is disposed out of alignment with the retention slot, and wherein the locking section of the locking slot is disposed generally in alignment with the retention slot.

16. The piece of furniture of claim 8, wherein the locking section of the locking slot is disposed out of alignment with the retention section of the retention slot such that the first panel is maintained in an elastically bent configuration when the first panel is in an assembled configuration relative to the second panel.

17. The piece of furniture of claim 8, wherein the first panel further comprises a second retention tab extending from a first edge of the first panel;
wherein the second panel comprises a second retention slot comprising an insertion section with an opening configured to allow insertion of the second retention tab into the second retention slot and a retention section.

18. The piece of furniture of claim 17, wherein the insertion section of the retention slot and the insertion section of the second retention slot are disposed in alignment with each other and wherein the insertion section of the locking slot is disposed out of alignment with the insertion section of the retention slot and the insertion section of the second retention slot.

19. The piece of furniture of claim 17, wherein the second retention tab comprising a distal end and a neck which having a reduced thickness compared to the distal end, the neck being disposed between the distal end and the first edge, and wherein the retention section of the retention slot engages the neck and distal end of the second retention tab to prevent the second retention tab from being withdrawn from the second retention slot by moving in a direction perpendicular to the second panel.

* * * * *